(12) United States Patent
Lacy et al.

(10) Patent No.: US 10,286,996 B2
(45) Date of Patent: May 14, 2019

(54) AIRFLOW MODIFICATION PATCH AND METHOD

(71) Applicant: SAFRAN LANDING SYSTEMS UK LTD, Gloucester, Gloucestershire (GB)

(72) Inventors: Stuart Lacy, Gloucester (GB); Geoff Cumner, Cheltenham (GB); Peter Michaelides, Cheltenham (GB)

(73) Assignee: SAFRAN LANDING SYSTEMS UK LTD, Gloucester (GB)

( * ) Notice: Subject to any disclaimer, the term of this patent is extended or adjusted under 35 U.S.C. 154(b) by 772 days.

(21) Appl. No.: 14/427,765

(22) PCT Filed: Sep. 9, 2013

(86) PCT No.: PCT/GB2013/052348
§ 371 (c)(1),
(2) Date: Mar. 12, 2015

(87) PCT Pub. No.: WO2014/049328
PCT Pub. Date: Apr. 3, 2014

(65) Prior Publication Data
US 2015/0225069 A1    Aug. 13, 2015

(30) Foreign Application Priority Data

Sep. 25, 2012 (GB) .................. 1217070.0

(51) Int. Cl.
*B64C 1/40* (2006.01)
*B64C 21/10* (2006.01)
(Continued)

(52) U.S. Cl.
CPC ............... *B64C 1/40* (2013.01); *B64C 21/10* (2013.01); *B64C 23/06* (2013.01); *G01H 3/00* (2013.01); *B64C 2025/003* (2013.01); *B64C 2230/14* (2013.01); *Y02T 50/162* (2013.01); *Y02T 50/166* (2013.01)

(58) Field of Classification Search
CPC ........... B64C 1/40; B64C 23/06; B64C 21/10; B64C 2230/14; B64C 2025/003; G01H 3/00; Y02T 50/162; Y02T 50/166
See application file for complete search history.

(56) References Cited

U.S. PATENT DOCUMENTS

| 4,907,765 A | 3/1990 | Hirschel |
| 6,048,477 A | 4/2000 | Thorpe |

(Continued)

FOREIGN PATENT DOCUMENTS

| CN | 1421596 A | 6/2003 |
| CN | 202431609 U | 9/2012 |

(Continued)

OTHER PUBLICATIONS

Office Action for Chinese Patent Application No. 201380048696.9 dated Mar. 2, 2016.
(Continued)

*Primary Examiner* — Valentina Xavier
(74) *Attorney, Agent, or Firm* — RatnerPrestia

(57) ABSTRACT

An airflow modification patch 14 for reducing aeroacoustic noise generated by an aircraft assembly. The patch has a substrate 14a and a plurality of airflow disruption elements 14b.

14 Claims, 5 Drawing Sheets

(51) Int. Cl.
*B64C 23/06* (2006.01)
*G01H 3/00* (2006.01)
*B64C 25/00* (2006.01)

(56) References Cited

U.S. PATENT DOCUMENTS

| | | | |
|---|---|---|---|
| 6,491,260 B2 * | 12/2002 | Borchers | B64C 21/10 244/199.1 |
| 7,413,408 B1 * | 8/2008 | Tafoya | B64C 21/10 416/228 |
| 8,256,702 B2 | 9/2012 | Piet | |
| 8,414,261 B2 * | 4/2013 | Bonnet | F03D 1/0641 415/119 |
| 9,188,287 B2 * | 11/2015 | Krautschick | F15D 1/065 |
| 2001/0032907 A1 | 10/2001 | Borchers | |
| 2003/0226936 A1 | 12/2003 | Mau | |
| 2005/0163963 A1 | 7/2005 | Munro | |
| 2009/0020652 A1 | 1/2009 | Rincker | |
| 2009/0114002 A1 | 5/2009 | Bernitsas | |
| 2009/0176078 A1 | 7/2009 | Seror | |
| 2009/0200416 A1 * | 8/2009 | Lee | B64B 1/30 244/30 |
| 2009/0294596 A1 | 12/2009 | Sinha | |
| 2010/0108805 A1 | 5/2010 | Piet | |
| 2011/0006165 A1 | 1/2011 | Ireland | |
| 2011/0262705 A1 * | 10/2011 | Gupta | B64C 21/10 428/156 |

FOREIGN PATENT DOCUMENTS

| | | |
|---|---|---|
| DE | 3710691 | 10/1988 |
| EP | 0205289 | 12/1986 |
| EP | 0375586 | 6/1990 |
| EP | 0659641 | 6/1995 |
| EP | 1149761 | 10/2001 |
| FR | 2913948 | 9/2008 |
| FR | 2956646 | 8/2011 |
| JP | 2001050215 | 2/2001 |
| JP | 2001301696 | 10/2001 |
| JP | 2006-022937 A | 1/2006 |
| WO | 2004039671 | 5/2004 |
| WO | 2005090155 | 9/2005 |
| WO | 2011070340 A1 | 6/2011 |
| WO | 2012082667 | 6/2012 |

OTHER PUBLICATIONS

Great Britain Examination Report for Application No. GB1217070.0 dated Dec. 9, 2013.
International Search Report and Written Opinion for International Application No. PCT/GB2013/052348 dated Dec. 13, 2013.
Great Britain Intellectual Property Office Combined Search and Examination Report for Application No. GB1217070.0 dated Jan. 25, 2013.
Great Britain Intellectual Property Office Combined Search and Examination Report for Application No. GB1403853.3 dated Sep. 15, 2014.
International Search Report for International Application No. PCT/GB2013/052348 dated Nov. 28, 2013.
Chinese Office Action for Chinese Application No. 201380048696.9, dated Dec. 1, 2016, including English translation, 15 pages.

* cited by examiner

AIRFLOW MODIFICATION PATCH AND METHOD

This application is a U.S. National Phase application of PCT International Application No. PCT/GB2013/052348, filed Sep. 9, 2013, which claims the benefit of GB 1217070.0, filed Sep. 25, 2012, both of which are incorporated herein by reference.

BACKGROUND

Aircraft such as aeroplanes can generate considerable noise during a landing approach i.e. an approach to land. A significant portion of this noise is attributable to air flowing around the deployed landing gear and/or high lift devices such as flaps and slats.

Although during a landing sequence an aircraft may be travelling at around 80 s, the localised airflow around a noise-inducing component or region of the aircraft's airframe and landing gear may reach speeds of around 300 m/s; this can result in sound energy of around 200 W being dissipated as noise. The noise can be tonal, such as the whistling noise due to airflow over a cavity, or low frequency booming from wing boxes and panels, or broadband noise i.e. noise over a wide range of frequencies. Noise from turbulent airflow around the aircraft and wake turbulence is significant and the airflow around the aircraft, especially that circulating the wing, can cause elements of landing gear and high lift devices to vibrate, and these vibrating elements may in turn excite other elements of the aircraft such a wing boxes and surface panels; for example, landing gear doors. The above-noted types of noise are known in the art, and will be referred to herein, as aeroacoustic noise.

Aeroacoustic noise is undesirable because of the fact that airports are often located close to cities, or other densely populated areas. Aeroacoustic noise due to the landing gear and high lift devices is particularly problematic because it is radiated directly to ground due to the position of the landing gear under the aircraft and the high lift devices at chord wise extremities of the wing i.e. the leading and trailing edges of the wing.

Attempts have been made to address aeroacoustic noise problems. For example, it is known to provide an aircraft landing gear with fairings. A fairing is a generally rigid structure, often made from metal or composite materials, that is arranged to shield a noise-inducing region of an aircraft landing gear from airflow during landing. However, the present inventors have identified that known noise reducing devices, such as fairings, can undesirably increase the total weight of the aircraft. Moreover, known noise reducing devices, such as fairings, can undesirably increase envelope of aircraft components, such as the landing gear and/or high lift devices, and may affect articulation thereof. Fairings and the like can also affect cooling of components, such as brake parts, and are generally directional meaning that they may not be effective in crosswinds.

SUMMARY

In accordance with a first aspect of the present invention, there is provided a patch for reducing noise generated by an airflow negotiating a noise-inducing component of an aircraft assembly, the patch comprising:

a substrate arranged to be attached to the noise-inducing component, or an upstream component, on the aircraft assembly; and a plurality of airflow disruption elements associated with the substrate and being arranged to induce turbulence in the airflow to reduce the noise generated by the airflow negotiating the noise-inducing component.

Thus, the invention according to this aspect provides a patch which may be attached to a component of an aircraft assembly and is arranged in use to induce turbulence in an airflow moving relative to the aircraft assembly in order to reduce the noise that would otherwise be generated by the airflow negotiating a noise-inducing component of the aircraft assembly. Although the reduction in sound energy may be small, it may still produce an effective perceived noise reduction at ground level because the human ear is very sensitive to even small changes in sound energy; for example, 0.6 watts. Moreover, a patch according to embodiments of the invention may be arranged to dampen vibration on the noise-inducing component. The patch according to embodiment of the invention provide a simply means by which to position airflow disruption elements at a desired location on the aircraft assembly.

A plurality of the airflow disruption elements may each comprise a protrusion extending from the substrate in a direction generally away from the noise-inducing component.

A first one of the protrusions may have a first shape and a second one of the protrusions may have a second shape different from the first shape. This may enable the turbulating effect provided by the patch to be tailored to meet the surface profile of a noise-inducing component.

One or more of the protrusions may project from the substrate by at least 0.5 mm. In some embodiments one or more of the protrusions may project from the substrate by between about 0.5 mm and about 20 mm. Thus, the protrusions may provide an effective degree of drag or turbulence.

The protrusions may collectively have a flow-facing surface area of at least 1 mm$^2$. This may provide an effective degree of drag or turbulence.

The substrate may have a major face having a surface area of between about 20 mm$^2$ and about 5 m$^2$. This may provide an effective degree of drag or turbulence.

The airflow disruption elements may be removably coupled to the substrate. Thus, embodiments of the invention provide a simple means by which the configuration of the airflow disruption elements can be modified, which may be particularly useful in testing to determining how an airflow disruption patch affects noise generated by an airflow negotiating a noise-inducing region of an aircraft assembly.

The substrate may include a plurality of mounting elements arranged to position the airflow disruption elements.

The substrate may be arranged to define a regular or irregular array of protrusions.

The disruption elements may be arranged to increase drag by at least a factor of 1.1, 1.5, 2 or 3.

An edge of the patch may defines a generally serrated edge. This may increase or decrease the degree of drag or turbulence that would be induced by the airflow disruption elements.

In accordance with a second aspect of the present invention, there is provided an aircraft assembly including a patch according to any preceding claim.

The aircraft assembly may comprise a landing gear, a panel such as a flap, slat wing cover, or nacelle, a landing gear door, a pylon, a high lift device and the like. An aircraft may be a commercial or military aircraft, an unmanned air vehicle (UAV), or an inner atmosphere space vehicle. A noise inducing component may in some embodiments comprise a region of the aircraft assembly.

In some embodiments the patch may address the problem of aeroacoustic noise radiated directly to ground due to the position of the landing gear or other assembly under the aircraft.

In accordance with a third aspect of the present invention, there is provided a method of determining how an airflow disruption patch affects noise generated by an airflow negotiating a noise-inducing region of an aircraft assembly, the patch comprising:
- a substrate arranged to be attached to the noise-inducing component or an upstream component on the aircraft assembly; and
- a plurality of airflow disruption elements associated with the substrate and being arranged to induce turbulence in the airflow to reduce the noise generated by the airflow negotiating the noise-inducing component, the method comprising:
- coupling the airflow disruption patch to a region of the aircraft at or adjacent the noise-inducing component or an upstream component on the aircraft assembly;
- providing the airflow; and
- determining the level of noise generated by the airflow.

The method may further comprise the steps of:
- modifying the position of the airflow disruption patch;
- providing the airflow; and
- determining the level of noise generated by the airflow.

The method may further comprise the steps of:
- modifying the configuration of the protrusions of the airflow disruption patch;
- providing the airflow; and
- determining the level of noise generated by the airflow.

According to a fourth aspect of the present invention, there is provided an aircraft assembly including a plurality of airflow disruption elements arranged to induce turbulence in an airflow to reduce the noise generated by the airflow negotiating a noise-inducing component thereof.

Any of the preferred features of the first aspect may be applied to the aircraft assembly of the fourth aspect.

BRIEF DESCRIPTION OF THE DRAWINGS

By way of example only, certain embodiments of the invention will now be described by reference to the accompanying drawings, in which.

DETAILED DESCRIPTION

Figure 1:
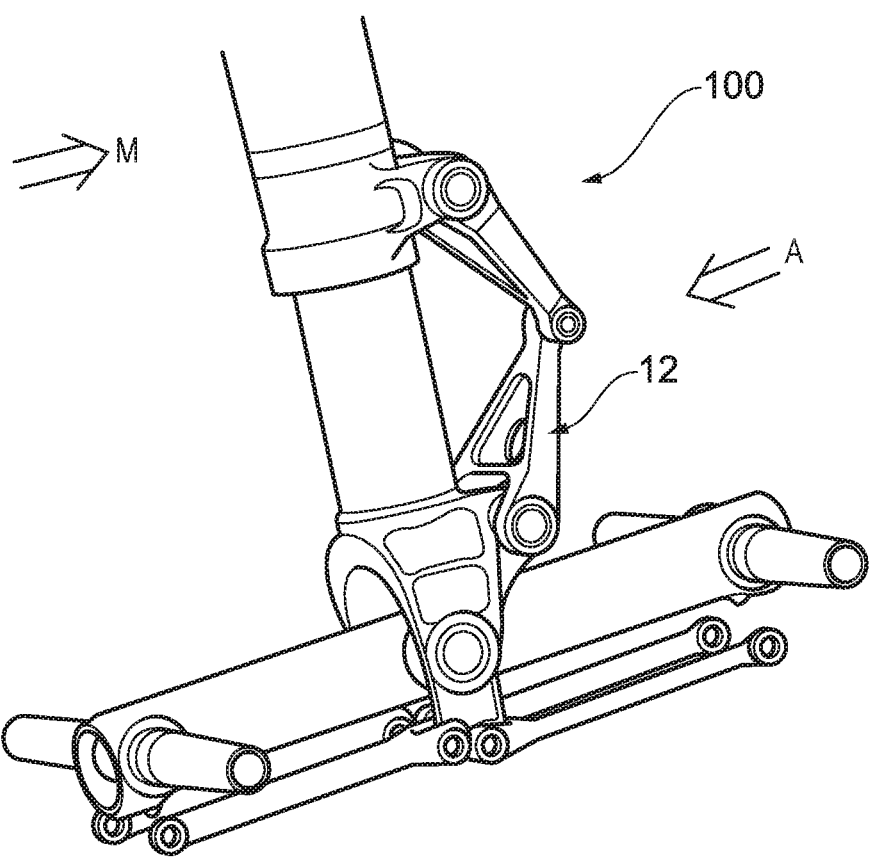
FIG. 1 is a diagram of a prior art landing gear assembly.

FIG. 1 shows a prior art landing gear 100. The landing gear 100 includes a noise-inducing region 12 in the form of a pin joint of a torque link. As will be appreciated, the landing gear 100 includes many noise-inducing components and regions, such as The landing gear 100 is shown in a deployed configuration, suitable for take-off and landing.

Due to the motion of the aircraft to which the landing gear 100 is coupled, the landing gear 100 generally moves in the direction of arrow M, which will be referred to as the landing gear motion direction M. Consequently, airflow moves relative to the landing gear 100 in the direction of arrow A, which will be referred to as airflow A. Airflow A can be considered to be a primary or resultant airflow from the forward and vertical velocity of the aircraft and will usually also include a side wind component.

Figure 2:
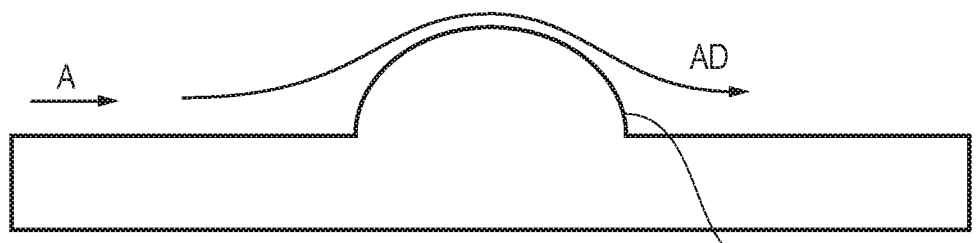
FIG. 2 is a diagram of a noise-inducing component of the landing gear assembly of FIG. 1.

Referring to FIG. 2, a noise-inducing component 12 of the landing gear 100 is schematically illustrated. The noise-inducing component 12 consists of a protrusion over which an aerodynamic airflow AD resulting from airflow A may pass to create aeroacoustic noise.

Figure 3:
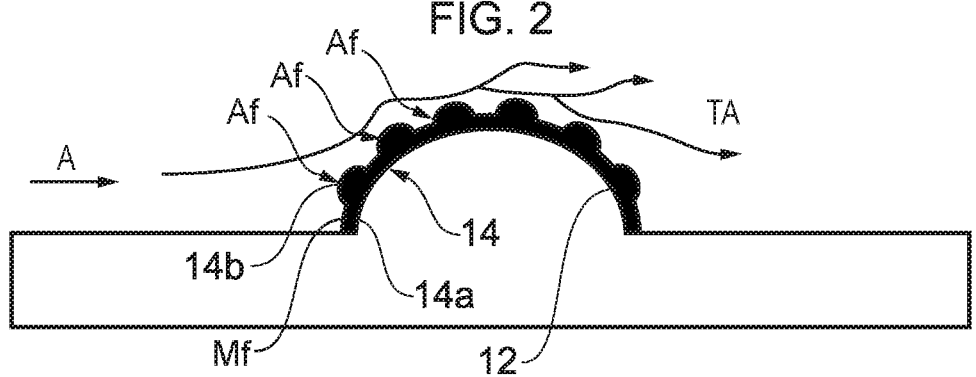
FIG. 3 is a diagram of the noise-inducing component of FIG. 2 provided with an airflow disruption patch according to an embodiment of the present invention.

FIG. 3 shows the noise-inducing component of FIG. 2 provided with an airflow disruption patch 14 according to an embodiment of the present invention.

As an overview, an airflow disruption patch 14 according to embodiments of the present invention is arranged to induce turbulence in the aerodynamic airflow AD shown in FIG. 2 to create a turbulated airflow TA i.e. an airflow that has been modified to exhibit a greater or lesser degree of turbulence that the degree of turbulence it would otherwise exhibit. Thus, the patch 14 changes the pattern of airflow around the component and/or or changes the pattern of airflow around other downstream components that create aeroacoustic noise, to reduce overall aeroacoustic noise. The present inventors have found that modifying the surface profile of a noise-inducing component 12 to incorporate a plurality of airflow disruption elements 14b arranged to induce turbulence in an airflow negotiating the surface profile generally reduces the aeroacoustic noise generated by the airflow negotiating the noise-inducing component 12 and/or downstream components relative to the noise that would be generated by an airflow negotiating the unmodified surface profile of the noise-inducing component 12 and/or downstream components. Optimum configurations of the airflow disruption elements 14b on the patch 14 and positions of the patch with respect to the noise-inducing component(s) may depend on the geometry of the noise-inducing component(s) and assembly they form a part of. Optimum configurations can be established through experiment and/or computer fluid dynamic analysis. The airflow disruption patch 14 according to embodiments of the present invention provides a simple means by which a plurality of airflow disruption elements 14b can be applied to a noise-inducing component 12 to modifying the surface profile thereof.

A noise-inducing region 12 may have one or more outwardly extending peripheral surfaces and/or inwardly extending surfaces or cavities and may comprise at least some of one or more components. In some embodiments a noise-inducing region may be defined by a coupling region between a first component which is movably coupled to a second component, examples being pin joints and cardan joints.

The airflow disruption patch 14 of the illustrated embodiment consists of a generally rigid substrate 14a having an engagement surface arranged to be coupled to the noise-inducing component 12. The patch 14 is sized to match the noise-inducing component 12. The engagement surface of the substrate 14a is shaped to conform to the outer surface of the noise-inducing component 12 in order to optimise the amount of surface area in contact therewith, which may improve an adhesive connection between the substrate 14a and the surface of the noise-inducing component 12. In other embodiments the engagement surface and/or substrate 14a may have any suitable configuration.

The plurality of airflow disruption elements are defined by a plurality of nodular protrusions 14b extending from the substrate 14a on an opposite side to the engagement surface. The protrusions 14b are arranged to induce turbulence in airflow A resulting in a turbulated airflow TA. The protrusions 14b may be arranged in a regular or irregular array and may each have any suitable configuration for inducing turbulence as described above. The amount of turbulence induced may be affected by the shape of the protrusions, which determines profile and induced drag and/or the area of the protrusions which along with surface roughness determines skin friction drag. In some embodiments one or more protrusions 14b may be arranged to establish a standing shock wave on the surface of the protrusion 14b to further increase and amplify the drag and turbulatory effect on airflow. In some embodiments the patch 14 may be provided with one or more protrusions 14b for every 10 mm square of substrate 14a. In some embodiments the protrusions 14b may comprise elongate elements or spiral elements. In other embodiments the airflow disruption elements may take any suitable form and may comprise protrusions, recesses and/or openings.

In embodiments where an airflow disruption patch 14 is arranged to be applied to a noise-inducing component 12 of an aircraft landing gear, the plurality of airflow disruption elements 14b may advantageously be arranged to increase drag to aid in slowing the aircraft during landing; for example, the elements may comprise protrusions that project from the substrate by between about 0.5 mm and about 20 mm, preferably between about 1 mm and 5 mm. It is preferred that the protrusions generally project from the major face M of the substrate by at least 1 mm. The one or more protrusions may have respective flow-facing surface areas Af collectively equaling at least 1 mm$^2$. In some embodiments the total flow-facing surface area of the one or more protrusion may be between about 2 mm$^2$ and about 10 m$^2$, and preferably between about 20 mm$^2$ and about 225 cm$^2$.

The airflow disruption patch 14 of embodiments of the invention may be formed of any suitable material. In some embodiments the airflow disruption patch 14 is made from plastics, sponge-like or woven material. The airflow disruption patch 14, or just the substrate 14a thereof, may be formed of a moulded material. In some embodiments the airflow disruption patch 14, or just the substrate 14a thereof, may be formed of a flexible material.

The airflow disruption patch 14 of embodiments of the invention may have any suitable size. In some embodiments the patch 14 is no larger than the surface area of the noise-inducing component 12 to which it is arranged to be coupled, such that the patch 14 may be directly attached to the surface without overlapping, or affecting adjacent components. The airflow disruption patch 14, or just the substrate 14a thereof, may have a thickness of between about 0.25 mm and about 10 mm. In some embodiments the substrate 14a may have a surface area of between about 20 mm$^2$ and about 5 m$^2$ and preferably between about 20 mm$^2$ and about 225 cm$^2$.

Figure 4:
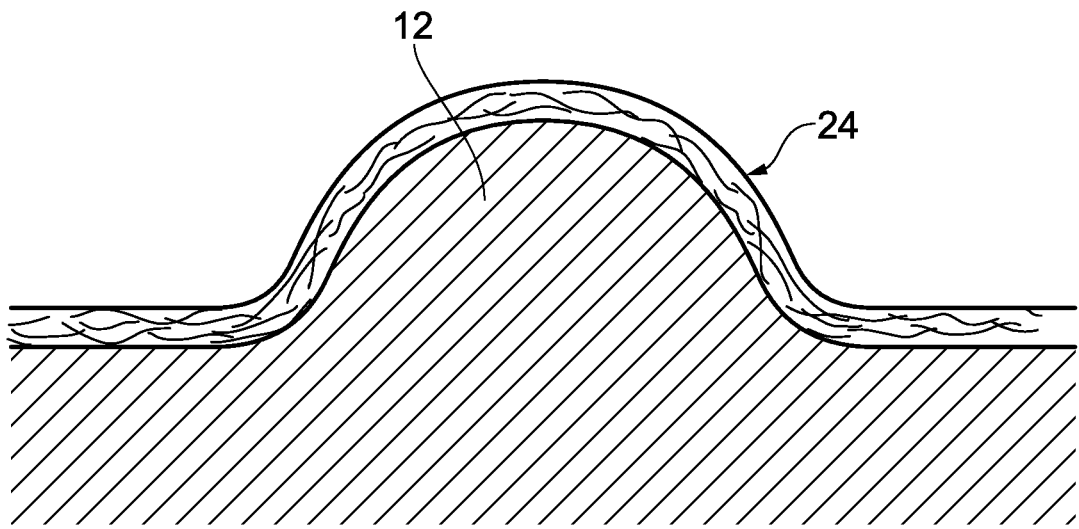
FIG. 4 is a diagram of the noise-inducing component of FIG. 2 provided with an airflow disruption patch according to an alternative embodiment of the present invention.

FIG. 4 shows the noise-inducing component of FIG. 2 provided with an airflow disruption patch 24 according to a further embodiment of the invention in which the patch 24 is formed of a woven material. The fibres of the woven material and/or gaps between them define the plurality of airflow disruption elements.

Figure 5:
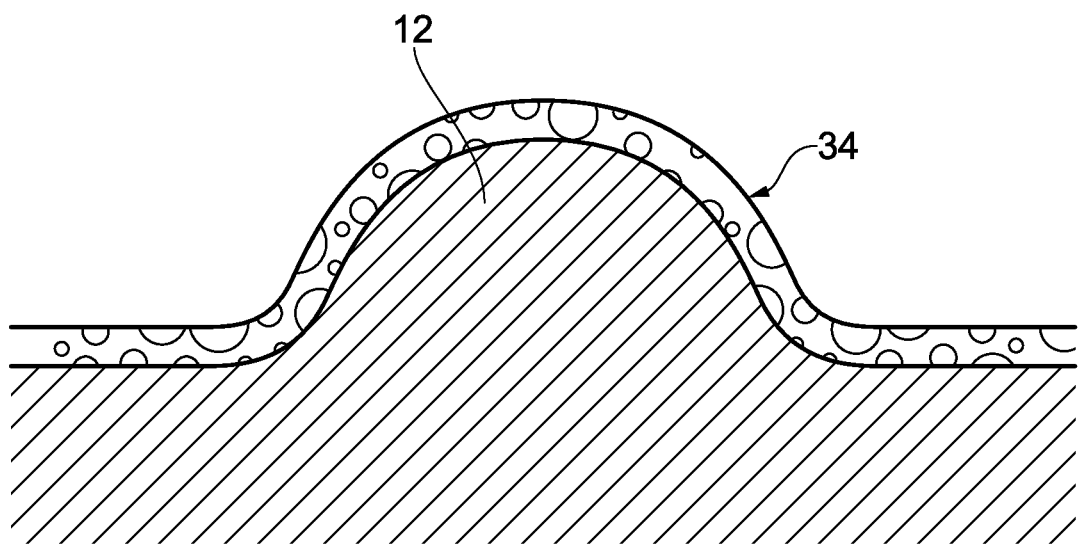
FIG. 5 is a diagram of the noise-inducing component of FIG. 2 provided with an airflow disruption patch according to an alternative embodiment of the present invention.

FIG. 5 shows the noise-inducing component of FIG. 2 provided with an airflow disruption patch 34 according to a further embodiment of the invention in which the patch 34 is formed of porous or sponge-like material. The irregular surface profile and/or openings in the porous or sponge-like material defines the plurality of airflow disruption elements.

Figures 6A, 6B:
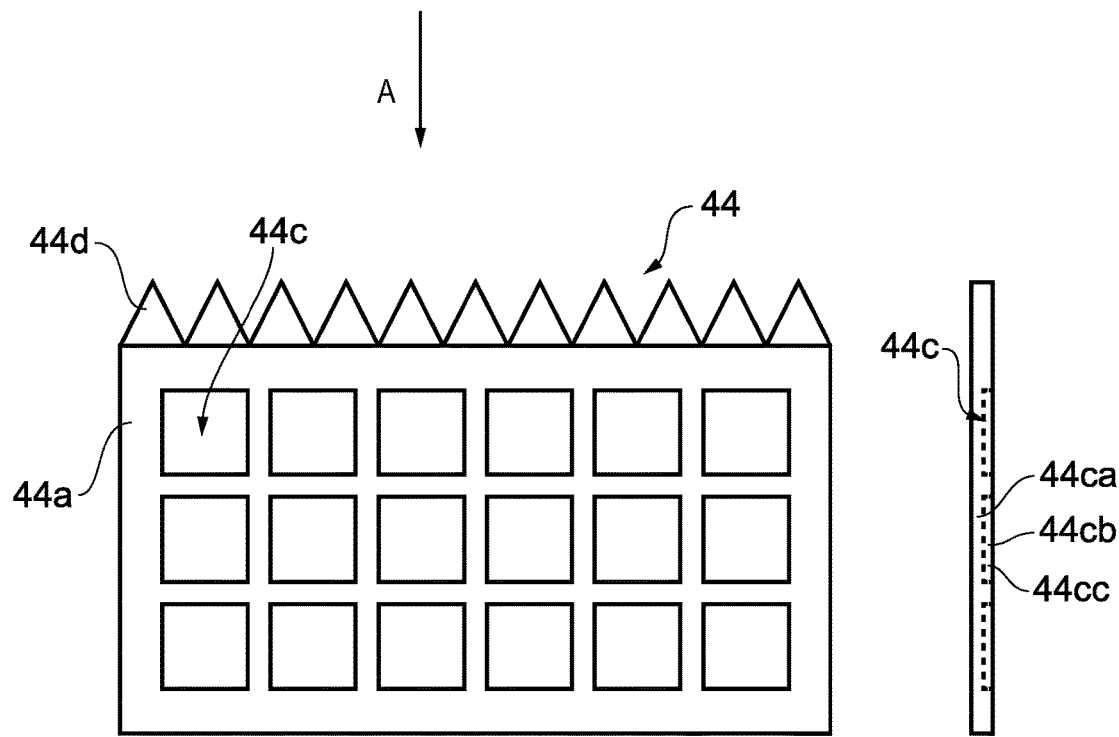
FIGS. 6a to 6c illustrate an airflow disruption patch according to an alternative embodiment of the present invention.
Figure 6C:
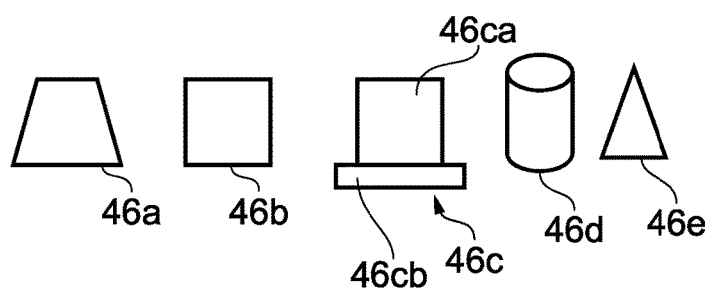

FIGS. 6a to 6c show an airflow disruption patch 44 according to a further embodiment of the present invention. As an overview, the patch 44 of the illustrated embodiment includes a substrate 44a defining a plurality of holes 44c, each hole 44c being arranged to receive a protrusion element 46a-46e. The protrusion elements 46a-46e have different configurations. Thus, the patch 44 according to some embodiments facilitates user defined protrusion configurations in a simple manner, which may be beneficial in testing for optimum airflow disruption patch surface geometry for a particular noise-inducing component 12.

As best shown in FIG. 6a, plurality of holes 44c are configured to define a regular array, but may be ordered in any suitable manner capable of positioning protrusion elements 46a-46e. The substrate 44a also includes a serrated or jagged disruption edge 44d positioned to face the airflow A in use. The disruption edge 44d is arranged to induce turbulence in the airflow A to contribute to the turbulated airflow TA. In some embodiments, the substrate 44a may be provided with multiple disruption edges 44d, or in some cases the substrate 44a may not include a disruption edge 44d.

As shown in FIG. 6b, each hole 44a has a relatively narrow upper portion 44ca opening onto the top surface of the substrate 44a, and a relatively wide lower portion 44cb opening onto the lower, engagement surface of the substrate 44a so as to define a shoulder surface 44cc between the sidewalls of the two hole portions 44ca, 44cb. The lower hole portion 44cb is arranged to receive a flange 46cb of a protrusion element 46c with the protrusion 46ca extending through the upper hole portion 44ca, the shoulder surface 44cc inhibiting the flange 46cb moving into the upper hole portion 44ca. Thus, once affixed to a noise-inducing component 12, the substrate 44a is arranged to retain the protrusion elements 46c within the holes 44c. In some embodiments adhesive may be applied to a shoulder surface 44cc and/or flange 46cb of a protrusion element 46c couple the protrusion element 46c to the substrate 44a. In other embodiments, the holes 44c may have any suitable configuration to at least partially receive the protrusion elements 46a-46e; for example the holes 44c may be blind holes and/or of uniform cross-section. The protrusion elements 46a-46e should be configured to match the holes. In other embodiments, the holes 44c may be replaced by clips or other mounting elements arranged to position and in some cases retain the protrusion elements 46a-46e.

FIG. 6c illustrates some examples of the protrusion elements 46a-46e. The protrusion elements 46a-46c and 46e are shown side on, whereas the protrusion element 46d is shown in perspective. The protrusion element 46a is a truncated right circular cone; the protrusion element 46b is a cube; the protrusion element 46c is a cube with an attachment flange 46c, as discussed above; the protrusion element 46d is a right circular cylinder; and the protrusion element 46e is a pyramid. It should be noted that the shapes indicated are examples; a protrusion element arranged to form part of an airflow disruption patch according to embodiments of the present invention may take any suitable form. Although the protrusion element 46c is the only one shown with an attachment flange 46c, any protrusion element may be provided with an attachment flange 46c.

An airflow disruption patch according to embodiments of the invention advantageously provides a low-profile means of reducing aeroacoustic noise, and as such may not affect kinematics of the landing gear or the like. A patch may be formed of a plastics or other light weight material, resulting in a light weight solution to the problem of aeroacoustic noise. A patch can be simply and quickly positioned in wind tunnel tests and on production parts.

Figure 7:
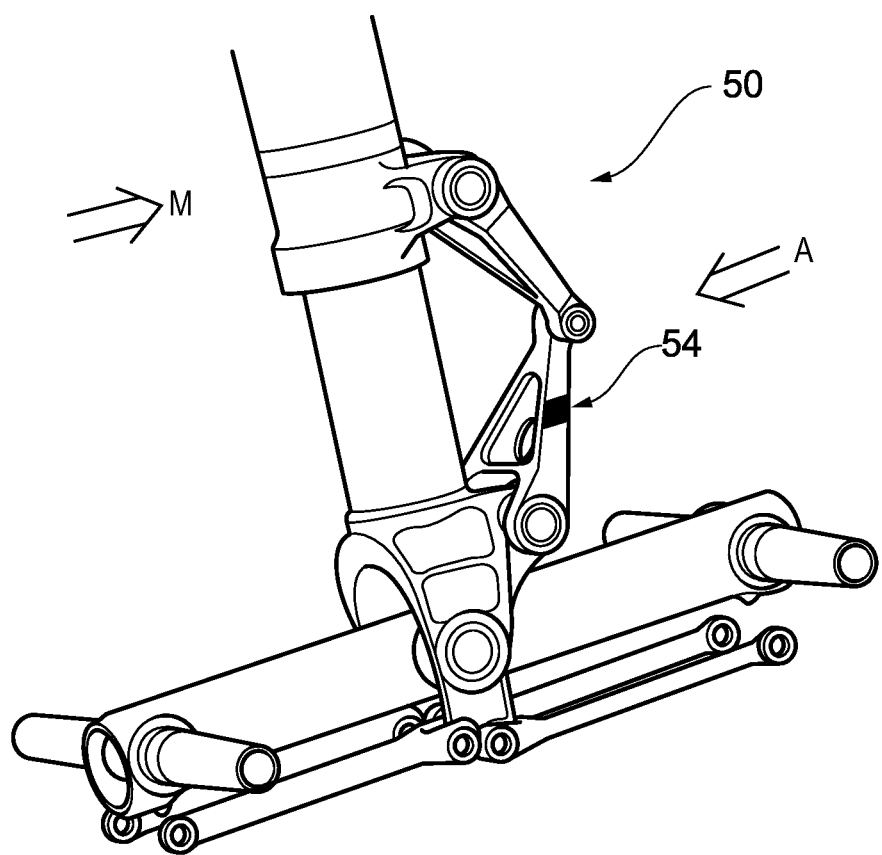
FIG. 7 is a diagram of a landing gear assembly according to an embodiment of the present invention.

FIG. 7 shows a landing gear assembly 50 including a noise-inducing component provided with an airflow disruption patch 54 according to an embodiment of the present invention.

Figure 8:
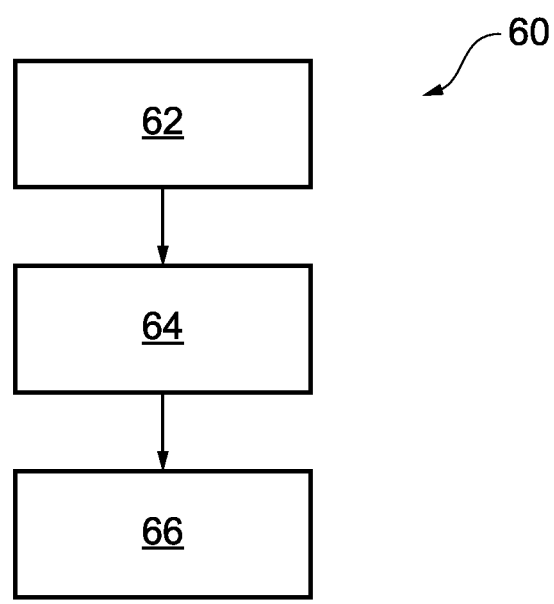
FIG. 8 is a flow chart illustrating a method according to an embodiment of the present invention.

FIG. 8 illustrates a method 60 of determining how an airflow disruption patch according to embodiments of the present invention affects noise generated by an airflow negotiating a noise-inducing region of an aircraft. At step 62 the method involves coupling the airflow disruption patch to a region of the aircraft at or adjacent the noise-inducing component. At step 64 the method involves providing the airflow. At step 66 the method involves determining the level of noise generated by the airflow.

In some embodiments the method may include the steps of modifying the position of the airflow disruption patch; providing the airflow; and determining the level of noise generated by the airflow. The airflow disruption patch according to embodiments of the invention facilities simple repositioning of patch, or removal and replacement with a new patch.

In some embodiments the method may include the steps of: modifying the configuration of the protrusions of the airflow disruption patch; providing the airflow; and determining the level of noise generated by the airflow. Embodiments of the invention in which the airflow disruption patch includes reconfigurable airflow disruption elements facilitates testing of various patch profiles.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" can mean "including" or "consisting of" and therefore does not exclude the presence of elements or steps other than those listed in any claim or the specification as a whole. The word "coupled" can mean "attached" or "connected". The singular reference of an element does not exclude the plural reference of such elements and vice-versa. In an apparatus claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft assembly including a patch for reducing noise generated by an airflow negotiating a noise-inducing component of the aircraft assembly, the patch comprising:
   a substrate arranged to be attached to the noise-inducing component, or an upstream component, on the aircraft assembly; and
   a plurality of airflow disruption elements associated with the substrate and being arranged to induce turbulence in the airflow to reduce the noise generated by the airflow negotiating the noise-inducing component;
   wherein one or more of the airflow disruption elements comprises a protrusion which projects from the substrate by at least 0.5 mm and is arranged in use to increase drag.

2. An aircraft assembly according to claim 1, wherein a plurality of the airflow disruption elements each comprise a protrusion extending from the substrate in a direction generally away from the noise-inducing component.

3. An aircraft assembly according to claim 2, wherein a first one of the protrusions has a first shape and a second one of the protrusions has a second shape different from the first shape.

4. An aircraft assembly according to claim 2, wherein one or more of the protrusions project from the substrate by between about 0.5 mm and about 20 mm.

5. An aircraft assembly according to claim 2, wherein the protrusions collectively have a flow-facing surface area of at least 1 $mm^2$.

6. An aircraft assembly according to claim 1, wherein the substrate has a major face having a surface area of between about 20 $mm^2$ and about 5 $m^2$.

7. An aircraft assembly according to claim 1, wherein the airflow disruption elements are removably coupled to the substrate.

8. An aircraft assembly according to claim 7, wherein the substrate includes a plurality of mounting elements arranged to position the airflow disruption elements.

9. An aircraft assembly according to claim 1, wherein the substrate is arranged to define a regular or irregular array of protrusions.

10. An aircraft assembly according to claim 1, wherein the disruption elements are arranged to increase drag by at least a factor of 1.1.

11. An aircraft assembly according to claim 1, wherein an edge of the patch defines a generally serrated edge.

12. An aircraft assembly according to claim 1 comprising an aircraft landing gear, a high lift device or an aircraft panel.

13. An aircraft assembly comprising:
   a noise-inducing component; and
   a patch for reducing noise generated by an airflow negotiating the noise-inducing component, the patch comprising:
      a substrate arranged to be attached to the noise-inducing component, or an upstream component, on the aircraft assembly; and
      a plurality of airflow disruption elements associated with the substrate and being arranged to induce turbulence in the airflow to reduce the noise generated by the airflow negotiating the noise-inducing component;
      wherein the patch is formed from a woven or sponge-like material.

14. An aircraft landing gear comprising:
   a noise-inducing component; and
   a patch for reducing noise generated by an airflow negotiating the noise-inducing component, the patch comprising:
      a substrate arranged to be attached to the noise-inducing component, or an upstream component, on the aircraft assembly, and
      a plurality of airflow disruption elements associated with the substrate and being arranged to induce turbulence in the airflow to reduce the noise generated by the airflow negotiating the noise-inducing component, wherein one or more of the airflow disruption elements comprises a protrusion which projects from the substrate by at least 0.5 mm and is arranged in use to increase drag.

* * * * *